(12) United States Patent
Nightingale et al.

(10) Patent No.: US 6,951,687 B2
(45) Date of Patent: Oct. 4, 2005

(54) MULTIFUNCTIONAL PRODUCT MARKERS AND METHODS FOR MAKING AND USING THE SAME

(75) Inventors: Stephen D. Nightingale, Bethesda, MD (US); N. Michael Tangen, Minneapolis, MN (US)

(73) Assignee: Burntside Partners, Inc., Bethesda, MD (US)

( * ) Notice: Subject to any disclaimer, the term of this patent is extended or adjusted under 35 U.S.C. 154(b) by 197 days.

(21) Appl. No.: 10/465,781

(22) Filed: Jun. 20, 2003

(65) Prior Publication Data

US 2004/0034214 A1 Feb. 19, 2004

Related U.S. Application Data

(63) Continuation-in-part of application No. 10/176,114, filed on Jun. 21, 2002.

(51) Int. Cl.⁷ .............................. D01F 6/00; D02G 3/00
(52) U.S. Cl. ...................... 428/397; 428/398; 428/376; 493/961
(58) Field of Search ................................. 428/397, 398, 428/376; 493/961

(56) References Cited

U.S. PATENT DOCUMENTS

| | | |
|---|---|---|
| 1,477,094 A | 12/1923 | Wilson |
| 2,712,997 A | 7/1955 | Cooley |
| 2,868,644 A | 1/1959 | Eisenberg |
| 3,188,689 A | 6/1965 | Breen |
| 3,303,252 A | 2/1967 | Rogers |
| 3,438,781 A | 4/1969 | MacMillan et al. |
| 3,469,990 A | 9/1969 | Eisenberg |
| 3,692,423 A | 9/1972 | Okamoto et al. ........... 425/131 |
| 3,725,192 A | 4/1973 | Ando et al. |
| 3,923,438 A | 12/1975 | Perla ........................ 425/131.1 |
| 4,029,820 A | 6/1977 | Eisenberg .................... 426/74 |
| 4,152,271 A | 5/1979 | Eisenberg ..................... 252/1 |
| 4,161,249 A * | 7/1979 | Dashow ..................... 428/156 |
| 4,370,114 A | 1/1983 | Okamoto et al. ........ 425/131.5 |
| 4,421,858 A | 12/1983 | Jackson ...................... 436/20 |
| 4,621,022 A * | 11/1986 | Kohaut et al. .............. 428/397 |
| 4,640,035 A | 2/1987 | Kind et al. .................... 40/625 |
| 4,654,165 A | 3/1987 | Eisenberg ................ 252/408.1 |
| 5,380,592 A * | 1/1995 | Tung .......................... 428/397 |
| 5,435,840 A | 7/1995 | Hilborn ...................... 106/20 |
| 5,484,650 A * | 1/1996 | Hernandez .................. 428/221 |
| 5,486,802 A * | 1/1996 | Leupold ..................... 335/306 |
| 5,527,611 A * | 6/1996 | Hernandez .................. 428/376 |
| 5,540,993 A * | 7/1996 | Hernandez .................. 428/376 |
| 5,540,994 A * | 7/1996 | Hernandez .................. 428/397 |
| 5,985,450 A * | 11/1999 | Keller ........................ 428/401 |
| 6,068,981 A | 5/2000 | Rittenburg et al. .......... 435/7.1 |
| 6,153,136 A | 11/2000 | Collier et al. ............... 264/103 |
| 6,200,610 B1 | 3/2001 | Graham ....................... 426/87 |
| 6,299,374 B1 | 10/2001 | Naor et al. .................. 401/198 |
| 6,352,772 B1 * | 3/2002 | Keller ........................ 428/364 |
| 6,406,725 B1 | 6/2002 | Taylor ......................... 426/87 |
| 6,551,353 B1 | 4/2003 | Baker et al. ................ 623/1.42 |
| 6,787,227 B2 * | 9/2004 | Koehnen et al. ............ 428/364 |
| 2002/0173042 A1 | 11/2002 | Colman et al. |

FOREIGN PATENT DOCUMENTS

| | | |
|---|---|---|
| WO | WO 90/14441 | 11/1990 |
| WO | WO 99/04259 | 1/1999 |
| WO | WO 03/009667 | 2/2003 |

OTHER PUBLICATIONS

S. Nicewarner–Peña et al., "Submircometer Metallic Barcodes," Science, vol. 294, Oct. 5, 2001, pp. 137–141.

* cited by examiner

Primary Examiner—N. Edwards
(74) Attorney, Agent, or Firm—Fleshner & Kim, LLP

(57) ABSTRACT

Disclosed are multi-functional markers for use on various products, particularly products which have one or more visually indistinguishable characteristics, for identifying and/or providing information about such products, and to processes and materials for making and using such markers.

22 Claims, 6 Drawing Sheets

MULTIFUNCTIONAL PRODUCT MARKERS
AND METHODS FOR MAKING AND USING
THE SAME

This application is a continuation-in-part of prior U.S. patent application Ser. No. 10/176,114, filed on Jun. 21, 2002, which is herein incorporated by teference in its entirety.

BACKGROUND OF THE INVENTION

1. Field of the Invention

The present invention relates to multi-functional markers for use on various products, particularly products which have one or more visually indistinguishable characteristics, for identifying and/or providing information about such products, and to processes and materials for making and using such markers.

2. Background of the Related Art

There is a demand for meat and agricultural products with specifically defined but visually undetectable characteristics. Examples include meat from range fed animals and organically grown vegetables. Premiums are paid for such products. These premiums have in turn created a demand for safe, reliable, easily read, and inexpensive markers on or in those products that can independently and securely verify their origin and provenance.

Other sources of demand for such markers include the following. The spread of bovine spongiform encephalopathy by contaminated animal protein supplements from the United Kingdom to Europe, the Middle East Asia, and North America has led consumers and regulators throughout the world to demand "agrotraceability," a higher standard of proof of the origin and provenance of animal as well as human foods than is currently maintained in many parts of the world. Consumer diffidence about (and allergies to) food made from genetically modified organisms have extended the demand for traceability to all products intended for human and animal consumption, including nutritional supplements, vitamins, and flavorings. Fear of terrorism, domestic and foreign, has magnified this demand.

Parallel demand for safe, reliable, easily read, and inexpensive markers exists in other industries, such as the pharmaceutical, fragrance, and jewelry industries, where trade in premium products with attributes often indistinguishable by untutored sensory examination routinely encounters risks, such as passage across international borders, that make these products vulnerable to piracy. Careful packaging and continuous surveillance during transit and storage may partially address this demand, but neither totally excludes the possibility that the product within the package has been adulterated, either accidentally or deliberately.

The number of different products in each of the above-mentioned categories (for example, the number of different fields from which an agricultural product may originate) is in the millions; a marker of these products must be able to identify each one of these. At the same time, to prevent contamination of the enviroiument of the marked product, and subsequent contamination of other marked products by those residual markers, the markers must be designed to degrade under specified conditions after use. For example, markers of edible products must be digestible as well as edible.

The physical size of the markers must be sufficiently small such as not to change the specifications or the visual appearance of the marked products, and yet be sufficiently large so that the smallest informative dimension can be reproducibly identified. These requirements essentially constrain the dimensions of the markers to the sub-millimeter range. At this size, binary codes are distinctly more reliable, and less expensively read, than analog codes. The markers must be easily manipulable, so that they can be attached securely to the marked product in highly reproducible marker/product ratios, using methods that avoid or minimize obstacles to attachment such as electrostatic forces, surface tension, or air currents to which markers of this size could be susceptible.

Presently, no product in commerce meets all of these requirements.

Prior processes of marking food products and pharmaceuticals typically involve disposing a dye onto the surface of a product. For example, U.S. Pat. No. 6,299,374 discloses capillary feed marking instruments capable of dyeing edible colored marks directly on food substrates and medicaments. U.S. Pat. No. 6,068,981 discloses adding a substance to a medicament and detecting the ingested substance in the blood or other body parts following ingestion of the medicament by chemical, photoelectric or immunological methods. The number of such dyes or other substances easily detected and known to be safe, however, is small. Moreover, the use of synthetic molecules such as nuclcic acids, proteins or carbohydrates as markers of products that large numbers of people might ingest or use would require that each such molecule be rested for environmental as well as biologic safety and compatibility.

Small particulate markers have been proposed for tracking various products. For example, U.S. Pat. No. 3,861,886 describes a method of tagging bulk material with microparticles having properties different from the properties of the particles that make up the bulk material. U.S. Pat. Nos. 3,772,200 and 3,897,284 disclose refractory microparticles or polymeric microparticles containing low levels of elements such as manganese, cobalt, zinc, cadmiurn and tin. U.S. Pat. No. 4,053,433 discloses microparticles having an orderly sequence of visually distinguished colored segments U.S. Pat. No. 6,455,157 discloses the use of two or more different microparticles having several color layers forming a code, such as those described in U.S. Pat. No. 4,390,452, to mark products. All of these markers, however, are limited either by the materials required for their manufacture or by their limited adherence to or ability to maintain a uniform distribution among the marked objects.

U.S. Pat. No. 4,640,035 discloses markers made from transverse sections of an assembly of elongated elements. It is not possible, however, to distinguish one face of this marker from another, thereby limiting the amount of information it can store. In addition, this patent fails to disclose any commercially practical methods for manufacturing markers from these elongated elements.

Accordingly, there remains a need for a multi-functional product marker that is safe, reliable, easily-read and inexpensive marker for products that can independently and securely verify information about the marked product, such as its origin and provenance.

The above references are incorporated by reference herein where appropriate for appropriate teachings of additional or alternative details, features and/or technical background.

SUMMARY OF THE INVENTION

An object of the present invention is to solve at least the problems and/or disadvantages described above and to provide at least the advantages described hereinafter.

Another object of the present invention is to provide a safe, reliable, easily read, and inexpensive marker for products that can independently and securely verify information about the marked product, such as its origin and provenance. Advantages of the markers described below include their high information storage capacity, environmental and biological compatibility, sub-millimeter scale binary data encoding capacity, and manipulability.

Another object of the present invention is to provide methods of making and using these product markers.

In accordance with these and other objects, a first embodiment of the present invention is directed to a multi-functional product marker which comprises a substantially solid cross-section of a primary polymeric fiber having a longitudinal axis, wherein: (i) the cross-section has substantially parallel first and second faces and at least one additional face substantially perpendicular to the first face and/or second face and substantially parallel to the longitudinal axis of the polymeric fiber, (ii) the cross-section has an aspect ratio of the mean distance across the first and second faces to the mean distance between the first and second faces of between 1:1 and 200:1, and (iii) the cross-section contains at least one optically readable identifier for identifying the product, such as a groove and/or void and/or area of optically detectable difference (any one of which may become detectable only after the market has been exposed to one or more physical events, e.g. a particular temperature or chemical entity, such as water or a toxin) and at least one optically readable orientor for differentiating between the first and second faces, such as an asymmetric groove and/or void and/or area of optically detectable difference and/or an embedded two-dimensional chiral pattern (i.e. a pattern that cannot be superimposed on its mirror image without lifting the image from its two-dimensional plane), wherein the orientor is optically readable on both the first and second face of the product marker.

A second preferred embodiment of the present invention is directed to a method for making a multi-functional product marker comprising: (i) winding a primary polymeric fiber around a spool or other suitable form for a plurality of revolutions, wherein the primary polymeric fiber has a longitudinal axis and contains at least one identifier and at least one orientor substantially throughout; (ii) coating or embedding the primary polymeric fiber with or in a suitable material, either before, during or after the winding process; and (iii) cutting the plurality of the primary polymeric fiber coated with and/or embedded in the suitable material along an axis substantially perpendicular to the longitudinal axis of the primary polymeric fiber to produce a cut section of the embedding material that contains the plurality of cross-sections of the primary polymeric fiber having substantially parallel first and second faces and at least one additional face substantially perpendicular to the first face and/or said second face and substantially parallel to the longitudinal axis of the polymeric fiber, wherein the cross-section contains at least one optically readable identifier for identifying the product, such as a groove and/or void and/or area of optically detectable difference, one or more of which may become detectable only after the marker has been exposed to one or more physical events such as a particular termperature or chemical entities including but not limited to water or a toxin, or a plurality of grooves and/or voids and/or areas of optically detectable differences, one or more of which may become detectable only after the marker has been exposed to one or more physical events such as a particular temperature or chemical entities including but not limited to water or a toxin, and at least one optically readable orientor for differentiating between the first and second faces, such as an asymmetric groove and/or void and/or area of optically detectable difference, one or more of which may become detectable only after the marker has been exposed to one or more physical events such as a particular temperature or chemical entities including but not limited to water or a toxin, or an embedded chiral pattern thereof, wherein the orientor is optically readable on both the first and second face of the product marker.

Additional advantages, objects and feature of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A first preferred embodiment of the present invention is directed to a multi-functional product marker which comprises a substantially solid cross-section of a primary polymeric fiber having a longitudinal axis, wherein: (i) the cross-section has substantially parallel first and second faces and at least one additional face substantially perpendicular to the first face and/or second face and substantially parallel to the longitudinal axis of the primary polymeric fiber, (ii) the cross-section has an aspect ratio of the mean distance across the first and second faces to the mean distance between the first and second faces of between 1:1 and 200:1, and (iii) the cross-section contains at least one optically readable identifier for identifying the product and at least one optically readable orientor for differentiating between the first and second faces, wherein the orientor is optically readable on both the first and second face of the product marker.

Figure 1:
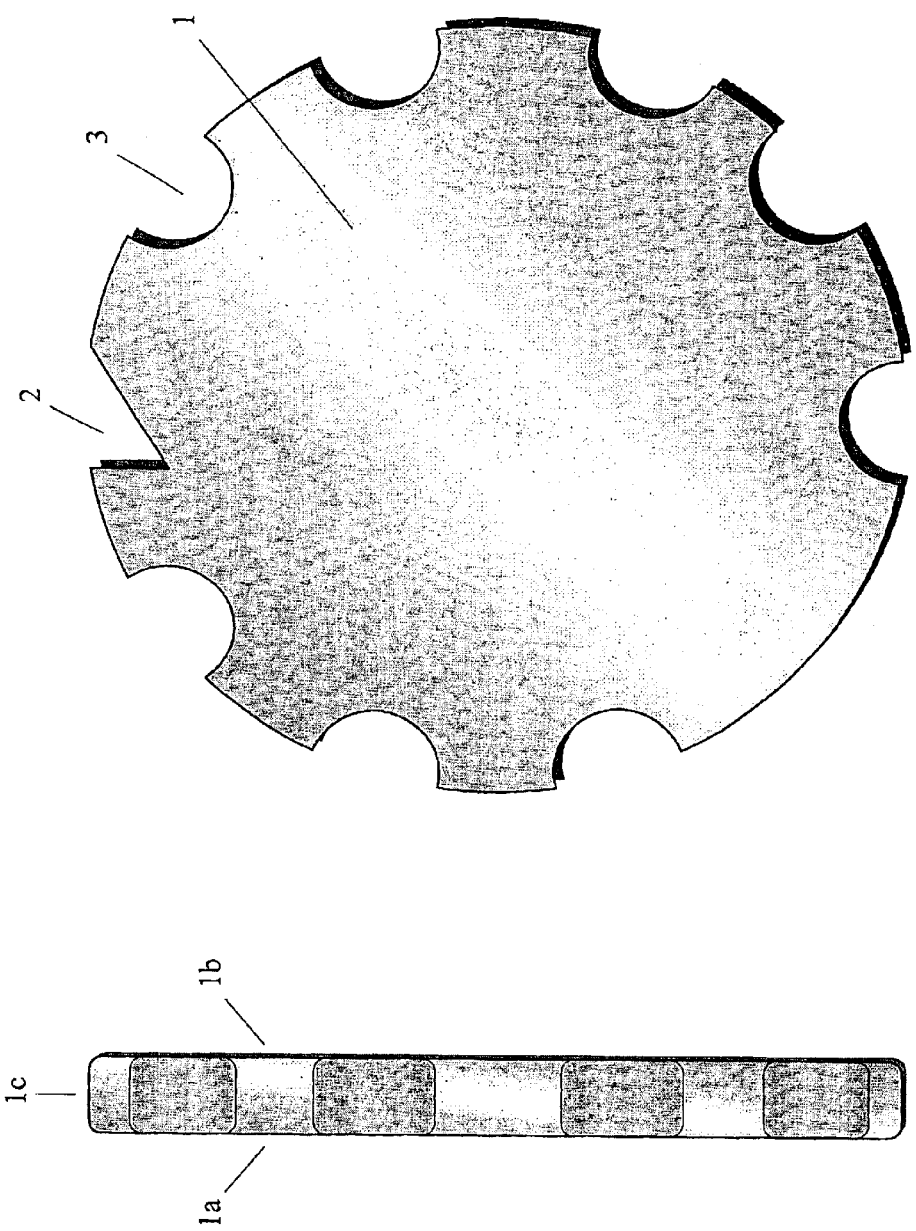
FIG. 1 is a plane view and side view of an exemplary multi-functional product market made in accordance with the methods of the present invention, with a scored achiral pattern around its circumference in the shape of a pie crust.

FIG. 1 illustrates an exemplary preferred embodiment of a multi-functional product marker in accordance with the present invention. Such a multi-functional product market 1 is generally in the shape of a flat disk, having first 1a and second 1b faces which are substantially parallel and a third face 1c substantially perpendicular to the first 1a and second 1b faces.

The inventive multi-functional product markers include both an orientor 2 for differentiating between the various faces of the marker, and identifiers 3 for providing information about the product. According to certain preferred embodiments of the present invention, the orientor and the identifier are the same. In other preferred embodiments of the present invention, the orientor and the identifier are not the same.

According to the present invention, the orientor on the inventive multi-functional product marker is optically visible on both the first and second faces of the product marker and allows a user to visually differentiate between these two faces. The orientor thereby ensures that the user is viewing the identifier in the proper orientation. The chirality or "handedness" of the orientor permits the spatial relationships, and therefore the order, of the identifiers to be uniquely determined, and therefore increases the amount of information each product marker can carry to increase exponentially rather than linearly for each additional identifier.

The orientor used in the present invention is preferably a mark, such as a groove, a void (e.g. a hole or opening), or an area of optically detectable difference (e.g. a defined area of a different composition of matter, color or similar physical property, such as absorbance or fluorescence), or a chiral pattern of such marks on one or more of the faces of the multi-functional product marker. All such marks must be chiral to allow a user to visually differentiate between the first and second faces of the marker.

Figure 2:
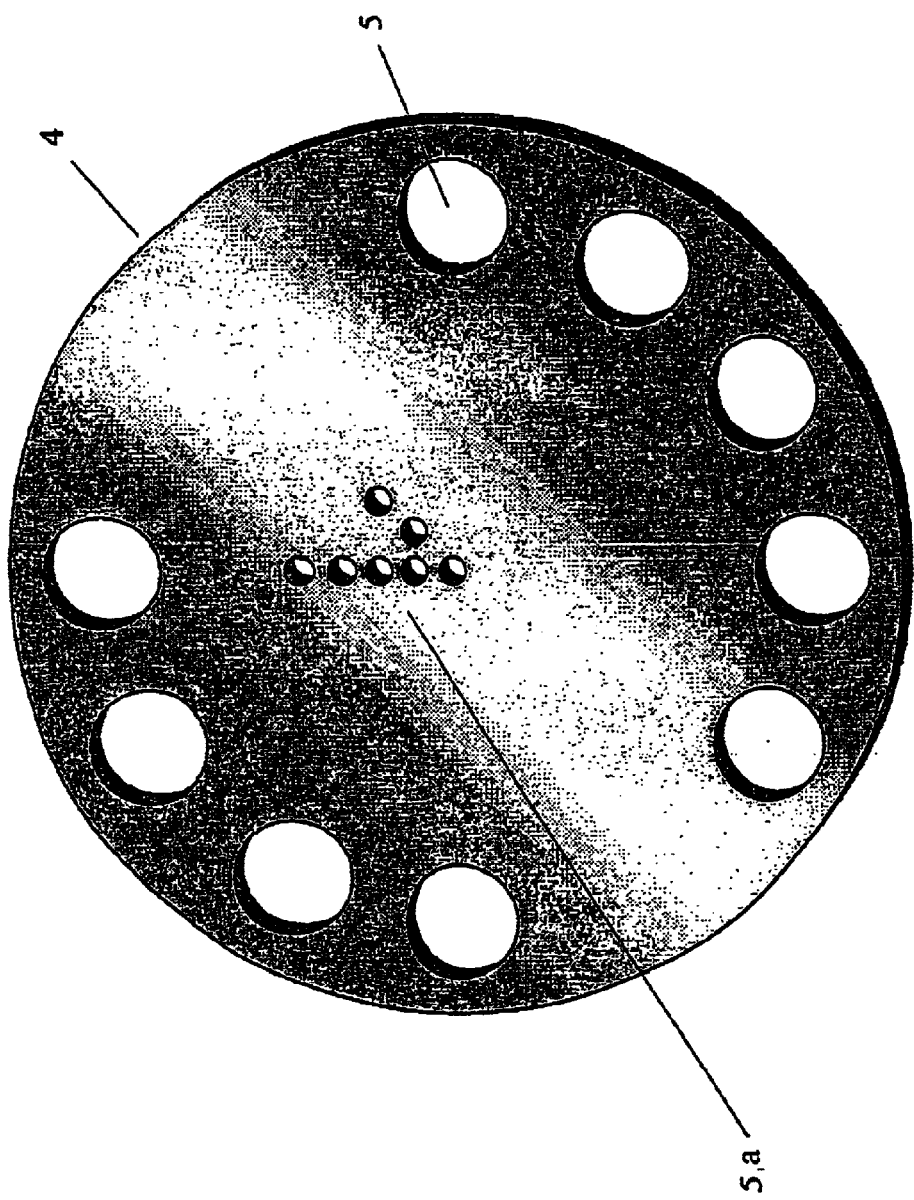
FIG. 2 is a plane view of an exemplary multi-functional product marker made in accordance with the methods of the present invention, with an embedded achital pattern in the shape of a clock face and hands.
Figure 3:
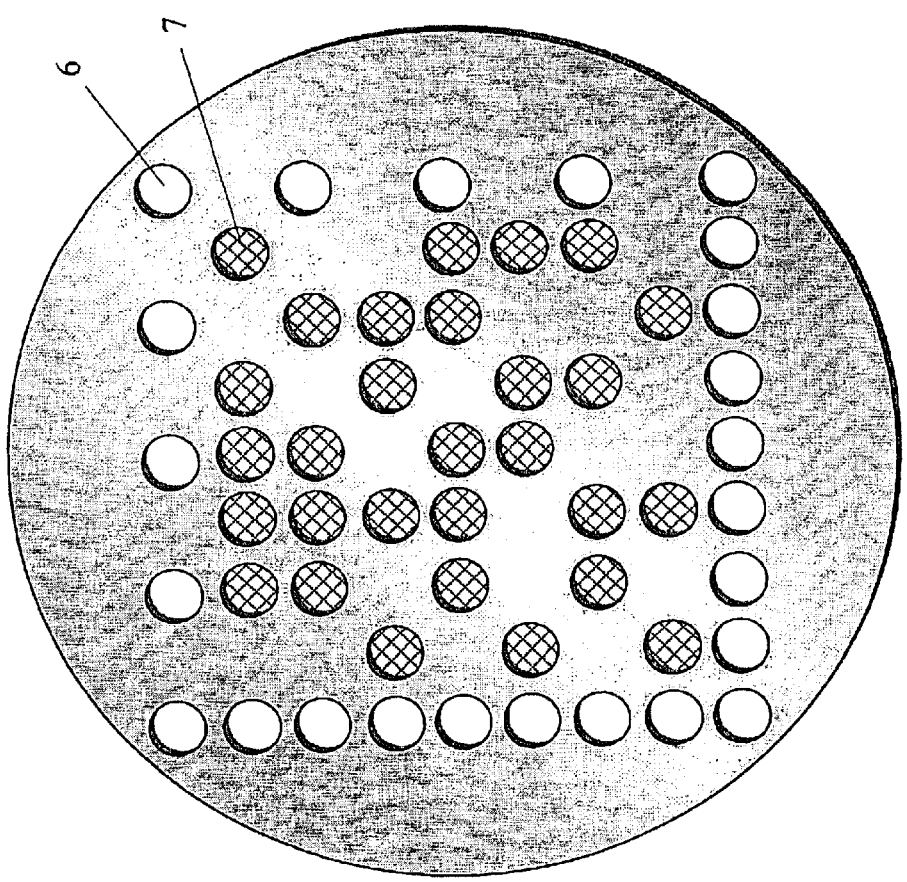
FIG. 3 is a plane view of an exemplary multi-functional product marker made in accordance with the methods of the present invention, with an embedded achiral pattern in the shape of a two-dimensional bar code.

FIG. 2 illustrates a chiral pattern of discrete areas in the shape of a clock face in which the orientors 5a, the hands of the clock, are separate from the identifiers 5, the hours of the clock. FIG. 3 illustrates discrete areas in the shape of a two-dimensional bar code, in which the orientors 6, the marks around the periphery of the code and the identifiers 7, the marks within the periphery, are part of the same structure.

Preferred orientors for use with the inventive product markers include, but are not limited to, the following: (i) at least one asymmetric groove or an asymmetric pattern of grooves in at least one face of the cross-section of the polymeric fiber, (ii) at least one asymmetric void or asymmetric pattern of voids in at least one face of the cross-section, (iii) a cross-section of at least one asymmetric secondary polymeric fiber or asymmetric pattern of secondary polymeric fibers contained substantially within the cross-section of the primary polymeric fiber, and (iv) at least one chiral area of optically detectable difference.

Preferably, each of these marks (groove, void, cross-section and/or area) is optically visible on both the first face and the second face of the product marker. More preferably, each of these marks extends substantially the entire distance from the first face to the second face and is substantially parallel to the longitudinal axis of the primary polymeric fiber.

The identifier used in the present invention is preferably a mark, such as a groove, a void (e.g. a hole or opening), or an area of optically detectable difference (e.g. a defined area of a different color or similar detectable physical property, such as absorbance, luminescence, radioactivity, electrical impedance or fluorescence, or a defined area containing a substance having such a detectable physical property), or a pattern of such marks on one or more of the faces of the multi-functional product marker. Such a mark may be symmetric or asynmmetric based on the desired ammount of information to include on each multi-functional product marker.

More than one such identifier may be present on a single marker. In FIG. 1, the color of the marker 1 can carry information distinct from the information carried by the pie-crust pattern of grooves 3 around the periphery of the marker. The thickness of the marker and the chemical composition of its constituent parts can also carry information distinct from the information carried by the pie-crust pattern, or other patterns in other markers.

Preferred identifiers for use with the inventive product markers include, but are not limited to, the following: (i) at least one groove in at least one face of the cross-section; (ii) at least one void in at least one face of the cross-section; (iii) a cross-section of at least one secondary polymeric fiber contained substantially within the cross-section of the primary polymeric fiber, wherein the secondary polymeric fiber may be identical to or different in composition from that of the primary polymeric fiber; and (iv) at least one area of optically detectable difference.

When the orientor(s) and/or the identifier(s) is a cross-section of a secondary polymeric fiber, preferably the linear axis of the secondary polymeric fiber is substantially parallel to the longitudinal axis of the primary polymeric fiber. According to such embodiments, the cross-section of the secondary polymeric fiber may be symmetric or asymmetric.

Preferably, each of these identifiers (groove, void, cross-section, substance or property) is optically visible on the additional face(s) of the product marker. More preferably, each of these identifiers is optically visible on the additional face(s) of the product marker and extends substantially the entire distance from the first face to the second face.

According to certain preferred embodiments, such as when the identifier is a groove, void or cross-section, the identifier is also substantially parallel to the longitudinal axis of the primary polymeric fiber.

The primary polymeric fiber and, if present, the secondary polymeric fiber(s) employed in the present invention may be any suitable polymer, natural or synthetic, which has the desired characteristic(s) for the intended application(s) of the multi-functional product marker. The secondary polymeric fiber(s), when present, may be composed of the same polymer as the primary polymeric fiber or a different polymer or polymers, provided that such polymer (or polymers) are optically detectable under the conditions of final use of the inventive markers.

Suitable polymers for use in die present invention include those which can form stable fibers having a longitudinal axis. As used herein, the terms "stable fibers" are intended to mean fibers that are sufficiently resistant to excessive decomposition and/or deterioration when manipulated and/or modified in accordance with the methods of the present invention to provide the inventive multi-functional product markers. Accordingly, suitable polymers for use in the present invention include biodegradable polymers and non-biodegradablc polymers, water-soluble polymers and water-insoluble polymers, organic solvent-soluble polymers and organic solvent-insoluble polymers, natural polymers and synthetic polymers, and edible polymers and non-edible polymers.

Illustrative examples of suitable polymers for use in the present invention include, but are not limited to, the following: polylactide; hydroxypropyl cellulose; hydroxyethylcellulose; carboxymethyl cellulose; ethyl cellulose; starch; chitin; silk; zein; acrylonitrile-butadiene-styrene; polymethylmethacrylate; polyhydroxyethylmethacrylate; cellulose acetate; cellulose acetate butyratc; cellulose acetate propionate; polycarbonate; polystyrene; polyvinyl acetate; polyvinyl alcohol; styrene-acylonitrile; unplasticised (rigid) polyvinyl chloride; plasticised (flexible) polyvinyl chloride; high impact polystyrene; polyoxymethylene; polyformaldehyde (polyacetal); ethylene vinyl acetate copolymer; polyamide (nylon); polyethylene terephthalate (polyester); polybutylene terephthalate; low density polyethylene; linear low density polyethylene; high density polyethylene; polypropylene; poly 4-methyl pentene; polytetrafluoroethylene; and co-polymers or mixtures of any two or more thereof.

Preferred mixtures of polymers include mixtures of lower and higher molecular weight polymers and/or mixtures of D- and L-isomers of the same or different polymers, which may, for example, affect the melting point or optical properties of the fiber.

The primary polymeric fiber used for the inventive multi-function product markers may be prepared by any suitable method known and available to those skilled in the art. For example, in conventional melt-spinninig of fibers, a given polymer or miture of polymers is heated to a temperature at or near which it melts and is then extruded through an orifice in a die to form fibers which rapidly cool to become solid. The resulting polymer fibers may then be further processed as desired, for example by coating and/or stretching to improve tensile strength or the like.

Accordingly, the primary polymeric fiber used in the present invention may preferably be prepared by an extrusion process. An "extrusion process" is one in which one or more streams of molten polymers (or blends of polymers) is/are forced through one or more shaped orifices in a die (or spinneret), and the extrudate, such as polymeric fibers, is then cooled, usually until solid. The cross-section of the extrudate (viewed perpendicular to the flow direction or longitudinal axis of the polymer fiber) usually has the same shape as the orifice.

The polymers useful with extrusion processes include thermoplastics, elastomers before crosslinking, and thermosets before crosslinking. Thermoplastics include polyesters, polyamides, polyethers, polyolefins, halogenated polyolefins, fluorinated polyolefins, thermoptastic polyimides, poly(imide-ethers) and polycarbonates, and the like. Polymers which are extruded may also contain the usual additives such as fillers, reinforcing agents, antioxidants, colorants, pigments, etc. Exemplary of these are carbon black, glass fiber, clay, mica, graphite fiber, titanium dioxide, carbon fibers and natural fibers.

Extrusion processes are particularly preferred when the inventive multi-functional product marker includes one or more grooves as the orientor and/or the identifier. According to such embodiments of the present invention, the die or spinneret is preferably fabricated such that the orifice(s) through which the polymer melt is extruded are shaped to provide a polymeric fiber with one or more grooves in the outer periphery thereof, each groove being substantially parallel to the longitudinal axis (direction of extrusion flow) of the polymeric fiber.

More specifically, a replaceable sieve for use in the methods of the present invention includes at least one orifice corresponding in cross-section to the outer periphery of the extruded filament and produces an extruded filament having at least one orienting groove and at least one identifying groove in the outer periphery of the filament. By varying the orifice shapes, fibers having a variety of arrangements (e.g. numbers and/or shapes), of orienting and identifying grooves can be produced.

Additionally, a plurality of differently shaped fibers can be produced simultaneously. For example, by coating the primary polymeric fiber with a coating of the same or a different material while it is being or after it has been extruded, the marks can be made to lie completely within the circumference of the final fiber. Similar results can be achieved by any of the suitable methods known to those skilled in the art, such as that disclosed in U.S. Pat. No. 5,525,292.

Figure 4:
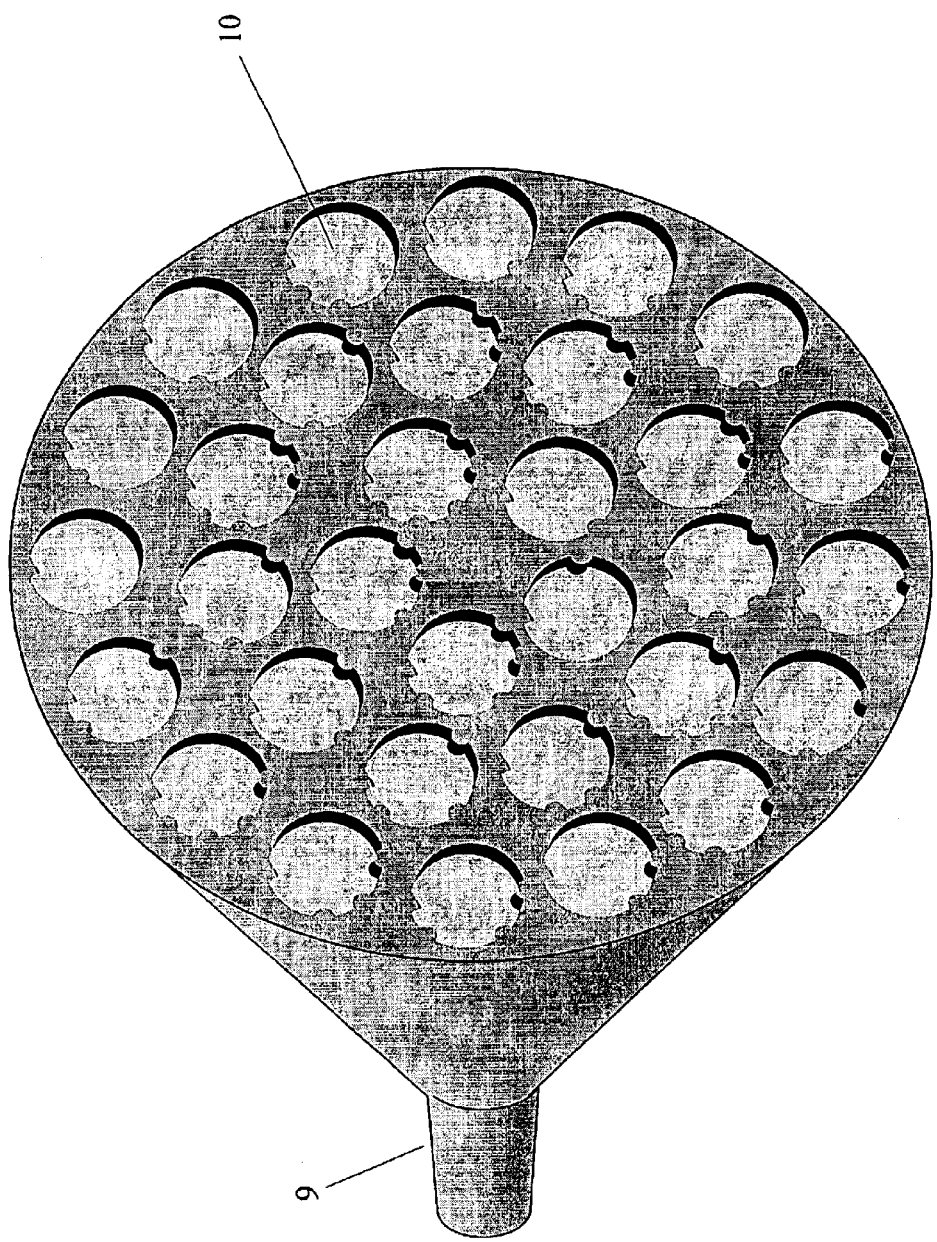
FIG. 4 is a view of a spinneret with multiple differently-shaped orifices through which multiple fibers with the same or different patterns of the general type shown in FIG. 1 can simultaneously be extruded.
Figure 5:
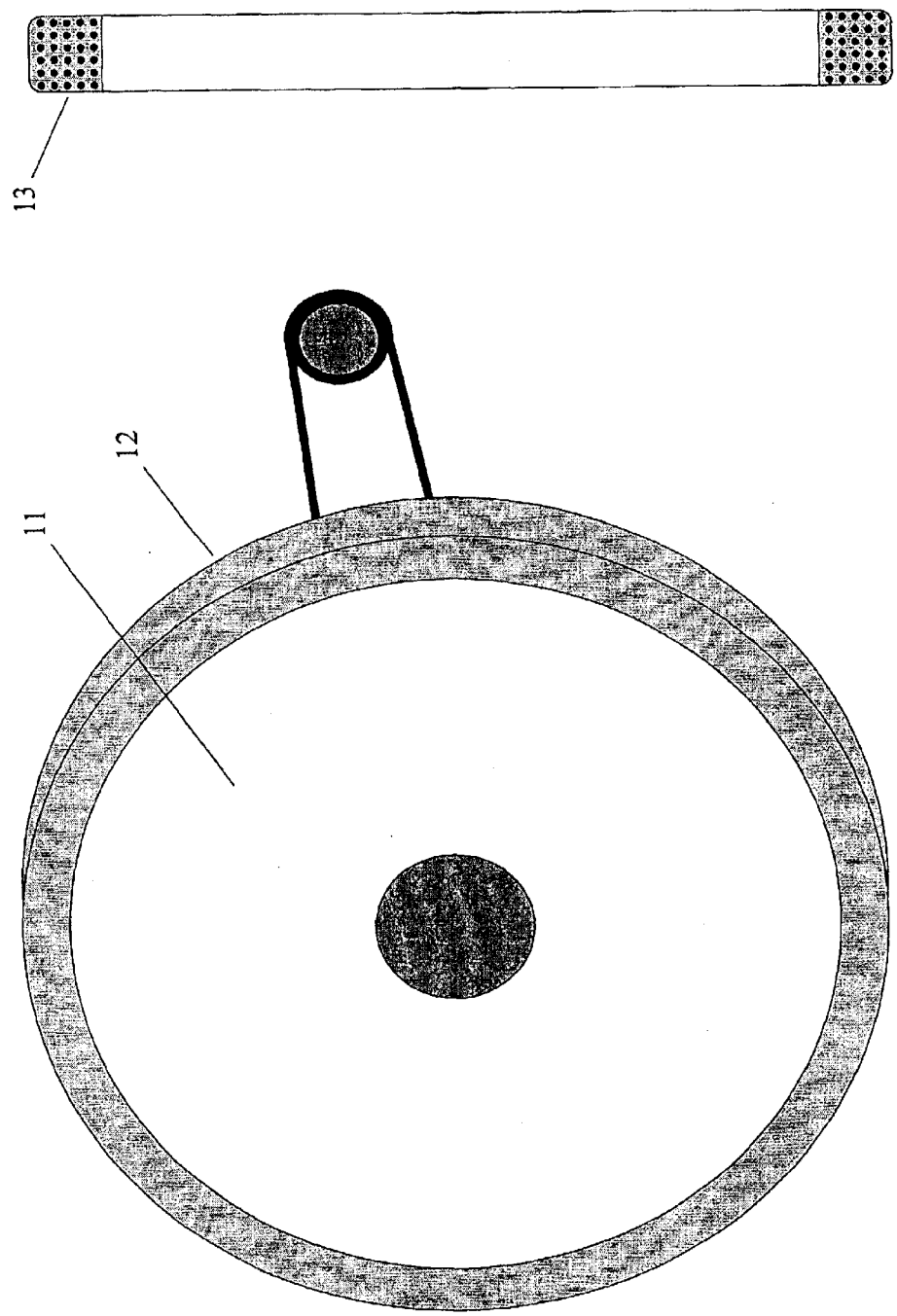
FIG. 5 is a side and cross-section view of fibers wound and embedded on a spool.
Figure 6:
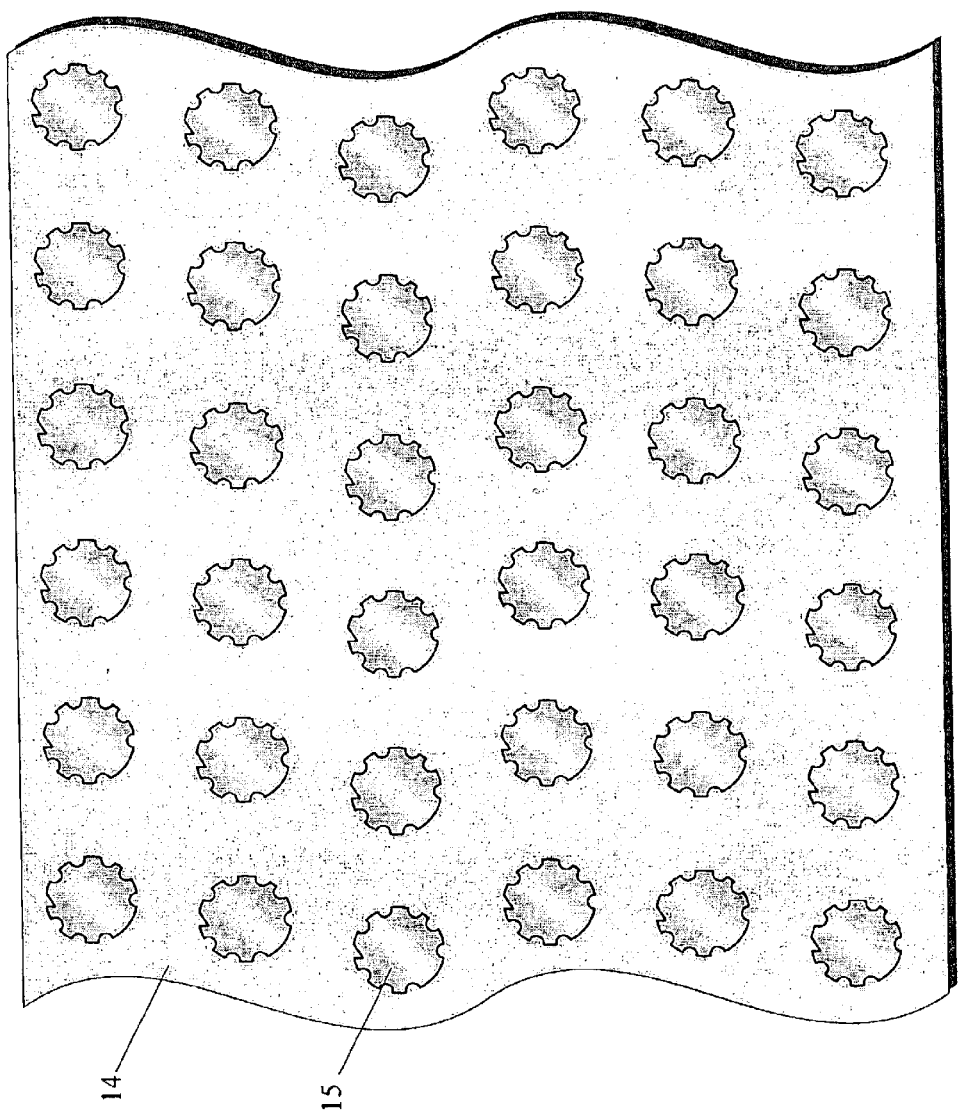
FIG. 6 shows multiple markers of the general type shown in FIG. 1 retained in the embedding material after manufacturing these markers by cutting thin sections of the spooled, embedded fibers with a microtome or similar device.

A typical spinneret 9 and corresponding replaceable sieves 10 are shown in FIG. 4. The sieves will be cast so that they can make as many different markers simultaneously as the available extrusion and spooling machinery will allow. For instance, according to certain preferred embodiments of the present invention, each orifice will be shaped in one of the 128 possible arrangements for markers including at least one orienting groove and up to seven identifying grooves. To make these orifices, a mold will be made in the specific shape of each of the 128 images, and the molds will be used create the orifices of the shape of these images in the sieve when the sieve is cast from molten metal.

Extrusion processes are also particularly preferred when the inventive multi-functional product marker includes one or more cross-sections of secondary polymeric fiber(s) as the orientor and/or the identifier. According to such embodiments of the present invention, the primary polymeric fiber is preferably prepared by any of the known extrusion methods suitable for producing composite fibers. Illustrative examples of such methods are disclosed in U.S. Pat. Nos. 5,366,804, 4,233,355 and 3,382,305 and European Patent Application No. 0,498,672.

Extrusion processes are further particularly preferred when the inventive multi-functional product marker includes one or more voids (holes or the like) as the orientor and/or the identifier. According to such embodiments of the present invention, the primary polymeric fiber is preferably prepared as above and then subsequently treated to remove the secondary polymeric fiber(s) from within, for example by treatment with an acid or base or a suitable solvent. Alternatively, the primary polymeric fiber may be first cut or otherwise transformed into a plurality of cross-sections, which are then treated to remove thc cross-section(s) of secondary polymeric fiber(s) within that plurality of cross-sections of primary polymeric fiber, for example by treatment with a suitable solvent.

Extrusion processes are also particularly preferred when the inventive multi-functional product marker includes one or more optically detectable substances as the orientor and/or the identifier. Illustrative examples of such detectable substances include, but are not limited to, antibodics, natural or synthetic nucleic acid sequences, natural or synthetic amino acid sequences, chemical dyes and combinations of two of more thereof.

According to such embodiments of the present invention, an effective amount of an optically detectable substance is combined with the polymer melt before extrusion to form the primary polymeric fiber. Alternatively, the primary polymeric fiber may be contacted with a solution or suspension containing an effective amount of an optically detectable substance after extrusion. Additionally, the primary polymeric fiber may be first cut or otherwise transformed into a plurality of cross-sections (i.e. product markers), which are then treated with a solution or suspension containing an effective amount of optically detectable substance.

After the primary polymeric fiber has been formed, whether by extrusion or other suitable method, it may be subjected to any suitable processing or modification prior to being cut or otherwise transformed into the inventive multi-functional product markers. For example, if the primary polymeric fiber is composed of a thermoplastic polymer, such as a polyamide, it may be cooled and/or further processed according to any of the methods generally known to those skilled in the art, including stretching and similar such treatments to improve properties such as tensile strength. Similarly, the primary polymeric fiber may be coated following extrusion, for example, with a solution or suspension containing a desired coating.

The shape of a transverse cross-section of the primary polymeric fiber (i.e when projected onto a plane) may be any suitable shape desired for the intended multi-functional product markers, such as circular, eliptical or polygonal (e.g. triangle, quadrilateral, pentagon, hexagon, heptagon, octagon, enneagon (nonagon), decagon, hendecagon (undecagon), dodecagon). Most preferably, the shape of a transverse cross-section of the primary polymeric fiber (i.e when projected onto a plane) is circular or eliptical.

According to such embodiments of the present invention, the maximum distance across a transverse cross-section of the primary polymeric fiber corresponds to the maximum distance across the first and second faces of the inventive multi-functional product markers. Accordingly, the primary polymeric marker may treated, for example by stretching, to reduce the maximum distance thereof prior to the production of the multi-functional product markers. Alternatively, for example when the primary polymeric fiber is produced by an extrusion process, the size of the orifice(s) in the die or spinneret is preferably selected to be about the same as the desired maximum distance across the first and second faces of the inventive multi-functional product markers.

According to certain preferred embodiments of the present invention, the maximum distance across the first face and/or the second face of the inventive multi-functional product markers is between 0.5 micrometers and 5 millimeters. More preferably, the maximum distance is between 1 micron and 1 millimeter, and even more preferably between 10 micrometers and 250 micrometers. Most preferably, the maximum distance across the first face and/or the second face of the inventive multi-functional product markers is between 30 micrometers and 100 micrometers.

According to still other preferred embodiments of the present invention, the maximum distance across the first face and/or the second face of the inventive multi-functional product markers is less than 500 micrometers. More preferably, the maximum distance is less than 300 micrometers, and even more preferably less than 100 micrometers. Most preferably, the maximum distance across the first face and/or the second face of the inventive multi-functional product markets is less than 40 micrometers.

The maximum thickness of the inventive multi-functional product markers (ie. the maximum distance between the first face and the second face) may be any value suitable for the intended use of the product markers. Accordingly, one skilled in the art may determine such values empirically and can vary such values as appropriate based on the intended application thereof.

According to certain preferred embodiments of the present invention, the maximum distance between the first face and the second face of the inventive multi-functional product markers is between 0.5 micrometers and 100 micrometers. More preferably, the maximum distance is between 0.5 micrometers and 50 micrometers, even more preferably between 1 micrometers and 20 micrometers and still even more preferably between 1 micron and 10 micrometers. Most preferably, the maximum distance between the first face and the second face of the inventive multi-functional product markers is between 3 micrometers and 5 micrometers.

Another preferred embodiment of the present invention is directed to methods for making multi-functional product markers comprising cutting or otherwise transforming a primary polymeric fiber into a plurality of transverse cross-sections, wherein:(i) each cross-section has substantially parallel first and second faces and at least one additional face substantially perpendicular to the first face and/or second face and substantially parallel to the longitudinal axis of the primary polymeric fiber, (ii) each cross-section has an aspect ratio of the mean distance across the first and second faces to the mean distance between the first and second faces of between 1:1 and 200:1, and (iii) each cross-section contains at least one optically readable identifier for identifying the product and at least one optically readable orientor for differentiating between the first and second faces, wherein the orientor is optically readable on both the first and second face of the product marker.

The multi-functional product markers of the present invention are preferably prepared by: (i) winding a primary polymeric fiber around a spool suitable form, such as a spool or cylinder, preferably for a defined number of rotations; (ii) coating or embedding the primary polymeric fiber with or in a suitable material before, while or after the fiber is being spooled; and (iii) cutting the primary polymeric fiber and the suitable material along an axis substantially perpendicular to the longitudinal axis of the primary polymeric fiber to produce a cross-section of the primary polymeric fiber having substantially parallel first and second faces and at least one additional face substantially perpendicular to the first face and/or said second face and substantially parallel to the longitudinal axis of the polymeric fiber, wherein each cross-section contains at least one optically readable identifier and at least one optically readable orientor, which is optically readable on both the first and second face of the product marker, for differentiating between the first and second faces.

According to certain preferred embodiments of the present invention, and the spatial relationship of each rotation of the fiber is controlled by the placement of grooves on the suitable form. Alternatively, the spatial relationship may be controlled by a machine that determines the placement of the fiber on the suitable form as it is being wound.

According to preferred embodiments of this method, the suitable material is applied to the suitable form and/or the primary polymeric fiber in liquid form, such as a melt or a solution. Most preferably, following application of the suitable material to the primary polymeric fiber, the suitable material is allowed to dry or harden prior to further processing of the inventive multi-functional product markers. The suitable form, such as a spool, may be composed of the same substance as the suitable material, but this is not required in the methods of the present invention.

Illustrative examples of suitable materials include, but are not limited to, the following: paraffin, beeswax, honey, gelatin, starches, sugars, glycerol, polyethylene glycol, vegetable oil, animal fat and combinations of two or more thereof. Choice of a particular suitable material will, of course, be determined in part by its compatibility with the primary polymeric fiber and its ability to embed or coat the fiber sufficiently to facilitate production of the inventive multi-functional product markers, and so may be determined empirically by one skilled in the art. For example, the suitable material should be of sufficient hardness and sufficient plasticity at some temperature within the tolerance of the primary polymeric fiber and the suitable form to withstand being cut into thin sections.

The embedding or coating of the primary polymeric fiber with the suitable material can he accomplished by any suitable method. Illustrative examples of such methods include, but are not limited to, the following (i) immersing the suitable form in the suitable material in liquid form, e.g. a melt or a solution, while the primary polymeric fiber is being wound around the form; (ii) immersing the suitable form and the wound primary polymeric fiber (i.e. after winding) in the suitable material in liquid form; (iii) spraying the primary polymeric fiber with the suitable material in liquid form while the primary polymeric fiber is being wound around the form; and (iv) spraying the suitable form and the wound primary polymeric fiber with the suitable material in liquid form.

After embedding or coating the primary polymeric fiber with the suitable material, the primary polymeric fiber is cut in a direction substantially perpendicular to its longitudinal axis to form multi-functional product markers. When the number of times the primary polymeric fiber has been wound around the spool is known, the number of markers produced by each cut is known, so units containing precise numbers of markers can easily be prepared. The primary polymeric fiber may be cut by any of the methods and techniques known to those skilled in the art. Preferably, the primary polymeric fiber is cut with a microtome or guillotine-type device.

In practicing the methods of the present invention, the multi-functional product markets can be applied to the desired product by any suitable method of adhering known to those skilled in the art. Fot example, the markers may preferably be applied by removing any residual suitable material (for example, by dissolving the material in a suitable solvent, by freeze-fracturing or by heating to sufficient temperature) and placing the product markers in a suitable carrier liquid. The carrier liquid containing the product markers may then be sprayed directly onto the product being marked. Alternatively, the multi-functional product markers may be dispersed by a jet of air onto the product being marked.

According to certain preferred embodiments of the present invention, the primary polymeric fiber may be polymer, such as carboxymethylcellulose, that is soluble in polar solvents, such as water, but insoluble in organic solvents such as hexane. After the primary polymeric fiber has been extruded, the fiber would be embedded while it is being wound in an anhydrous lipophilic substance, such as paraffin, and then cut into markers as described above.

After the wound primary polymeric fiber and the anhydrous lipophilic embedding material have been cut, the embedding material would be removed by washing the markers in a suitable organic solvent, such as hexane. The markers would then be suspended in a suitable anhydrous liquid, such as absolute alcohol, and sprayed onto or otherwise thoroughly mixed with the substance to be marked, such as a fine powder of an edible grain or an active pharmaceutical ingredient of a medicine. The marker would remain in or on the marked product even after the organic vehicle had evaporated, but would be removed when the marked material was mixed or contacted with water, for example, if the marked material was being cooked, ingested orally, or being resuspended for parenteral injection.

In still other preferred embodiments of the present invention, the primary polymeric fiber may be a water-soluble polymer as described above, but the coating or embedding material comprises gelatin that melts at a particular temperature, for example 160 F. Such a marker may be particularly useful in the processed or cooked meats industries.

Moreover, water-soluble markers embedded in suitable materials with known melting points down to the freezing point of water may also be useful as process controls in the food manufacturing industry. Markers embedded or redissolved in vegetable oil could find widespread use throughout the whole grain industry; as vegetable oil would provide an environmentally compatible as well as biodegradable bond between the marker and the kernel. Celluloses, such as hydroxypropyl cellulose, that are currently used as glazes for pharmaceutical tablets could also serve as vehicles for applying the inventive markers to tablets. Similarly, poly-L-lysine, which is widely used as a transparent agent that helps bind tissues to glass microscope slides, could be used as a vehicle for delivering markers onto gemstones. Marking of large quantities of foods could be greatly simplified by marking one or more flavors or other additives that are subsequently thoroughly mixed into the food to be marked. Markers for paper could be made of fibers made of poly-lactic acid, a polymer that composts at approximately the same rate as paper.

In order to facilitate optically reading of the orientor and/or identifier(s), it is preferable to remove the multi-functional product markers from the marked product, but this is not required to practice the methods of the present invention.

To remove the product markers from the marked product, an aliquot of the marked substance may be immersed in a liquid that may contain a detergent. Centrifugation may be used to increase the efficiency or speed of partitioning, if necessary. The liquid into which the product markers partition may then easily be placed on a glass microscope slide and the orientor(s) and the identifier(s) on the product markers optically read.

According to certain preferred embodiments of the present invention, using more than one product marker of the present invention can increase substantially the information carrying capacity thereof. Referring again to FIG. 1, each product marker of the particularly preferred illustrated embodiment of the invention described above carries 27, or 128, bits of information in 7 symmetric grooves 3 (the identifiers). An eighth asymmetric groove orients the reading frame (the orientor). If two of the inventive product markers are used, and one of the identifier grooves is used to indicate which product marker is read first, $2^{12}$ (4096) bits of information can be carried. If four markers are used, and two of the identifier grooves are used to indicate the order in which the product markers are read, $2^{20}$ (1,048,576) bits of information can be carried.

Since a complete code can be carried by more than one product marker, different elements of the code during stages of the life cycle of the marked product can be carried, thereby providing a potential increase in the security of the code.

Moreover, because of the properties of the inventive markers, they can be used not only to identify a marked substance, but also whether that substance has been exposed to a physical event or a chemical entity. For example, if the orientor(s) and/or the indentifier(s) comprise an area of optically detectable difference, then that area may include a substance or property which becomes detectable (or undetectable) upon exposure to a given physical event or chemical entity, or combinations thereof. Similarly, the inventive product markers may be used to determine which of the many components of a given mixture may have been exposed to a given physical event or a chemical entity, or combinations thereof. By varying the time of applying and reading these markers, they may also be used to determine the time and place at which such exposure took place.

If the chemical entity that makes an area of optically detectable difference detectable (e.g. visible to the naked eye) is a nucleic acid with a specific sequence complementary to a sequence of another nucleic acid, and a multitude of such markers (each with their own specific sequence) are employed concurrently, the markers can be used to simultaneously detect many different genetic entities, organisms, or products of organisms.

Likewise, if the chemical entity that makes an area of the marker optically detectable is an antibody with a specific affinity for a specific molecule, and a multitude markers (each with their own specific affinity) are employed concurrently, the markers can be used to simultaneously detect many immunologically distinct molecules, organisms, or products of organisms. Similar considerations apply if the chemical entity that makes an area of the marker visible is a chemical entity, such as biotin, which has a specific affinity for another chemical entity, such as avidin. While these attributes make the markers particularly useful for tests conducted during processing, transportation or storage of marked products, these attributes also make the inventive markers equally useful for tests conducted within a laboratory setting, such as screening for large numbers of genes and/or pathogens in one or more products or extracts and/or pooled samples and/or derivatives of one or more products.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A multi-functional product marker which comprises a substantially solid cross-section of a primary polymeric fiber having a longitudinal axis, wherein:

(i) said cross-section has substantially parallel first and second faces and at least one additional face substantially-perpendicular to said first face and/or said second face and substantially parallel to the longitudinal axis of said polymeric fiber;

(ii) said cross-section has an aspect ratio of the mean distance across said first face and said second face to the mean distance between said first and second faces of between 1:1 and 200:1; and (iii) said cross-section contains:
  (a) at least one optically readable identifier for identifying said product, wherein said at least one optically readable identifier comprises at least one void (5) in said first and second faces of said cross-section, said void extending substantially the entire distance between said first face and said second face and being substantially parallel to said longitudinal axis of said primary polymeric fiber, and
  (b) at least one optically readable orientor for differentiating between said first face and said second face, wherein said optically readable orientor is optically readable on both said first face and said second face and said at least one optically readable orientor comprises a chiral pattern of a plurality of voids (5a) in said first and second faces of said cross-section, each of said voids being symmetric or asymmetric and extending substantially through said cross-section and being substantially parallel to said longitudinal axis of said primary polymeric fiber.

2. The multi-functional product marker according to claim 1, wherein said multi-functional product maker is substantially as show in FIG. 2.

3. The multi-functional product marker according to claim 1, wherein said primary polymeric fiber comprises at least one polymer selected from the group consisting of polylactide, hydroxypropyl cellulose, hydroxyethylcellulose, carboxymethyl cellulose, ethyl cellulose, starch, chitin, silk, zein, acrylonitrile-butadiene-styrene, poly methylmethacrylate, polyhydroxyethylmethacrylate, cellulose acetate, cellulose acetate butyrate, cellulose acetate propionate, polycarbonate, polystyrene, polyvinyl acetate, polylvinyl alcohol, styrene-acrylonitrile, unplasticised (rigid) polyvinyl chloride, plasticised (flexible) polyvinyl chloride, high impact polystyrene, polyoxymethylene, polyformaldehyde (polyacetal), ethylene vinyl acetate copolymer, polyamide (nylon) polyethylene tetephthalate (polyester), polybutylene terephthalate, low density polyethylene, linear low density polyethylene, high density polyethylene, polypropylene, poly methyl pentene, polytetrafluoroethylene, and co-polymers or mixtures thereof.

4. The multi-functional product market according to claim 1, wherein the maximum distance across said first face or said second face is between 0.5 micrometers and 5 millimeters.

5. The multi-functional product marker according to claim 1, wherein the maximum distance between said first face and said second face is between 1 micrometer and 1 millimeter.

6. The multi-functional product marker according to claim 1, wherein the maximum distance across said first face or said second face is between 10 micrometers and 250 micrometers.

7. The multi-functional product according to claim 1, wherein the maximum distance between said fist face and said second face is between 1 micrometer and 25 micrometers.

8. The multi-functional product marker according to claim 1, wherein a projection of said cross-section in two dimensions along said longitudinal axis would appear substantially elliptical.

9. The multi-functional product marker according to claim 1, wherein a projection of said cross-section in two dimensions along said longitudinal axis would appear substantially elliptical.

10. The multi-functional product marker according to claim 1, wherein a projection of said cross-section in two dimensions along said longitudinal axis would appear substantially polygonal, wherein said polygon is selected from the group consisting of triangle, quadrilateral, pentagon, hexagon, heptagon, octagon, enncegon (nonagon), decagon, hendecagon (undecagon) and dodecagon.

11. A multi-functional product marker which comprises a substantially solid cross-section of a primary polymeric fiber having a longitudinal axis, wherein:

(i) said cross-section has substantially parallel first and second faces and at least one additional face substantially perpendicular to said first face and/or said second face and substantially parallel to the longitudinal axis of said polymeric fiber;

(ii) said cross-section has an aspect ratio of the mean distance across said first face and said second face to the mean distance between said first and second faces of between 1:1 and 200:1; and (iii) said cross-section contains:

(a) at least one optically readable identifier for identifying said product, wherein said at least one optically readable identifier comprises at least one groove (3) in said at least one additional face of said cross-section, said groove extending substantially the entire distance between said first face and said second face and having a longitudinal axis substantially parallel to said longitudinal axis of said primary polymeric fiber; and b) at least one optically readable orientor differentiating between said first face and said second face, wherein said optically readable orientor is optically readable on both said first face and said second face and said at least one optically detectable orientor comprises at least one asymmetric groove (2) in said at least one additional face of said cross-section, said groove substantially the entire distance between said first face and said second face and having a longitudinal axis substantially parallel to said longitudinal axis of said primary polymeric fiber.

12. The multi-functional product market according to claim 11, wherein said multi-functional product marker is substantially as shown in FIG. 1.

13. The multi-functional product marker according to claim 11, wherein said primary polymeric fiber comprises at least one polymer selected from the group consisting of polylactide, hydroxypropyl cellulose, hydroxyethylcellulose, carboxymethyl cellulose, ethyl cellulose, starch, chitin, silk, zein, acrylonitrile-butadiene-styrene, poly methylmethacrylate, polyhydroxyethylmethacrylate, cellulose acetate, cellulose acetate butyrate, cellulose acetate propionate, polycarbonate, polystyrene, polyvinyl acetate, polyvinyl alcohol, styrene-acrylonitrile, unplasticised (rigid) polyvinyl chloride, plastised (flexible) polyvinyl chloride, high impact polystyrene, polyoxymethylene, polyformaldehyde (polyacetal), ethylene vinyl acetate copolymer, polyamide (nylon), polyethylene terephthalate (polyester), polybutylene terephthalate, low density polyethylene, linear low density polyethylene, high density polyethylene, polypropylene, poly 4-methyl pentene, polytetrafluoroethylene, and co-polymers or mixtures thereof.

14. The multi-functional product marker according to claim 11, wherein the maximum distance across said first face or said second face is between 0.5 micrometers and 5 millimeters.

15. The multi-functional product marker according to claim 11, wherein the maximum distance between said first face and said second face is between 1 micrometer and 1 millimeter.

16. The multi-functional product marker according to claim 11, wherein the maximum distance across said first face or said second face is between 10 micrometers and 250 micrometers.

17. The multi-functional product according to claim 11, wherein the maximum distance between said first face and said second face is between 1 micrometer and 25 micrometers.

18. The multi-functional product marker according to claim 11, wherein a projection of said cross-section in two dimensions along said longitudinal axis would appear substantially circular.

19. The multi-functional product marker according to claim 11, wherein a projection of said cross-section in two dimensions along said longitudinal axis would appear substantially elliptical.

20. The multi-functional product marker according to claim 11, wherein a projection of said cross-section in two dimensions along said longitudinal would appear substantially polygonal, wherein said polygon is selected from the group consisting of triangle, quadrilateral pentagon, hexagon, heptagon, octagon, cannegon (nonagon), decagon, hendecagon (undecagon) and dodecagon.

21. The multi-functional product marker according to claim 11, wherein said optically readable orientor further comprises at least one void in said first and second faces of said cross-section, said void extending substantially the entire distance between said first face and said second face and being substantially parallel to said longitudinal axis of said primary polymeric fiber.

22. The multi-functional product marker according to claim 11, wherein said optically readable identifier and said optically readable orientor are the same.

* * * * *